United States Patent [19]

Huber

[11] Patent Number: 4,952,020

[45] Date of Patent: Aug. 28, 1990

[54] RIBBON CABLE WITH OPTICAL FIBERS AND ELECTRICAL CONDUCTORS

[75] Inventor: John H. Huber, Harrisburg, Pa.

[73] Assignee: AMP Incorporated, Harrisburg, Pa.

[21] Appl. No.: 391,071

[22] Filed: Aug. 9, 1989

[51] Int. Cl.[5] .......................... G02B 6/44; H01B 11/02

[52] U.S. Cl. .............................. 350/96.23; 174/117 R

[58] Field of Search ..................... 350/96.23; 174/115, 174/117 R, 117 F, 90

[56] References Cited

U.S. PATENT DOCUMENTS

| | | | |
|---|---|---|---|
| 3,775,552 | 11/1973 | Schumacher | 174/117 R |
| 4,230,395 | 10/1980 | Dean et al. | 350/96.23 |
| 4,409,424 | 9/1983 | King et al. | 174/117 F |
| 4,533,790 | 8/1985 | Johnston et al. | 174/117 R |
| 4,588,852 | 5/1986 | Fetterolf et al. | 174/117 F |
| 4,662,712 | 5/1987 | Tabata et al. | 350/96.23 |
| 4,678,264 | 7/1987 | Bowen et al. | 350/96.20 |
| 4,715,677 | 12/1987 | Saito et al. | 350/96.23 |
| 4,719,319 | 1/1988 | Tighe, Jr. | 174/103 |
| 4,740,054 | 4/1988 | Becker et al. | 350/96.23 |
| 4,763,983 | 8/1988 | Keith | 350/96.23 |
| 4,776,664 | 10/1988 | Okura | 350/96.23 |
| 4,784,461 | 11/1988 | Abe et al. | 350/96.23 |
| 4,856,867 | 8/1989 | Gaylin | 350/96.23 |
| 4,861,135 | 8/1989 | Rohner et al. | 350/96.23 |

*Primary Examiner*—William L. Sikes
*Assistant Examiner*—Akm E. Ullah
*Attorney, Agent, or Firm*—Gerald K. Kita

[57] ABSTRACT

A ribbon cable 1 is disclosed in which optical fibers 2 and electrical conductors 3 are spaced side to side within a flexible jacket, 4, webs 5 of the jacket 4 extend laterally between corresponding optical fibers 2 and corresponding conductors 3, the cable 1 is formed into a roll 9, the cable 1 can be unrolled to position the optical fibers 2 and the conductors 3 laterally spaced apart from one another, and a removable sheath 10 surrounds the roll 9 and prevents the cable 1 from being unrolled.

20 Claims, 2 Drawing Sheets

RIBBON CABLE WITH OPTICAL FIBERS AND ELECTRICAL CONDUCTORS

FIELD OF THE INVENTION

The disclosure pertains to a ribbon cable having optical fibers and electrical conductors.

BACKGROUND OF THE INVENTION

A known ribbon cable having optical fibers and electrical conductors is disclosed in U.S. Pat. No. 4,678,264. The ribbon cable includes optical fibers and electrical conductors, spaced apart side to side within a surrounding, flexible jacket, and each optical fiber and each conductor is contained within a corresponding sleeve of the jacket. An advantage of ribbon cable, as disclosed in U.S. Pat. No. 3,775,552, is that the optical fibers and electrical conductors are in a common plane, and are readily accessible for stripping off and insulative jacket of the cable, and for termination of the optical fibers and the conductors by corresponding optical couplings and corresponding electrical connections.

One disadvantage of ribbon cable is its lack of capacity for flexure in the common plane of the conductors and optical fibers. Ribbon cable is unsuitable for use in an environment that requires flexure of the cable in many different planes.

Another type of cable that is more suitable for flexure, contains multiple optical fibers in a bundle, wherein the optical fibers are not in a common plane and are packed closely together side to side in the bundle to reduce the number of interstitial spaces along the length of the bundle. For example, DE 3328-948 discloses a cable of this construction. The cable is capable of flexure in more planes of flexure than is a ribbon cable, but lacks the advantages of a ribbon cable wherein parallel optical fibers are in a common plane.

Another disadvantage of ribbon cable resides in its construction that lacks a structural feature to distinguish one lateral side of the cable from the other lateral side.

SUMMARY OF THE INVENTION

A ribbon cable is disclosed that has the flexibility of a cable wherein the optical fibers are in a bundle, and has a capability to be unrolled to position the optical fibers and the conductors side to side.

A feature of the invention resides in a ribbon cable comprising; optical fibers and electrical conductors spaced side to side within a surrounding, flexible jacket, the jacket having corresponding webs extending laterally between corresponding optical fibers and corresponding conductors, the cable is rolled transversely of its length to form a roll, the roll is constructed for being unrolled to position the optical fibers and the conductors laterally spaced apart from one another, and a removable sheath surrounds the roll and prevents the roll from being unrolled.

Another feature of the invention resides in a ribbon cable with a side to side geometry of asymmetric construction. The asymmetric construction advantageously distinguishes one side of the ribbon cable from another side of the cable to avoid mistaken orientation of the cable.

These and other advantages, features and objectives of the invention are disclosed by way of example from the following detailed description and accompanying drawings.

Figure 1:
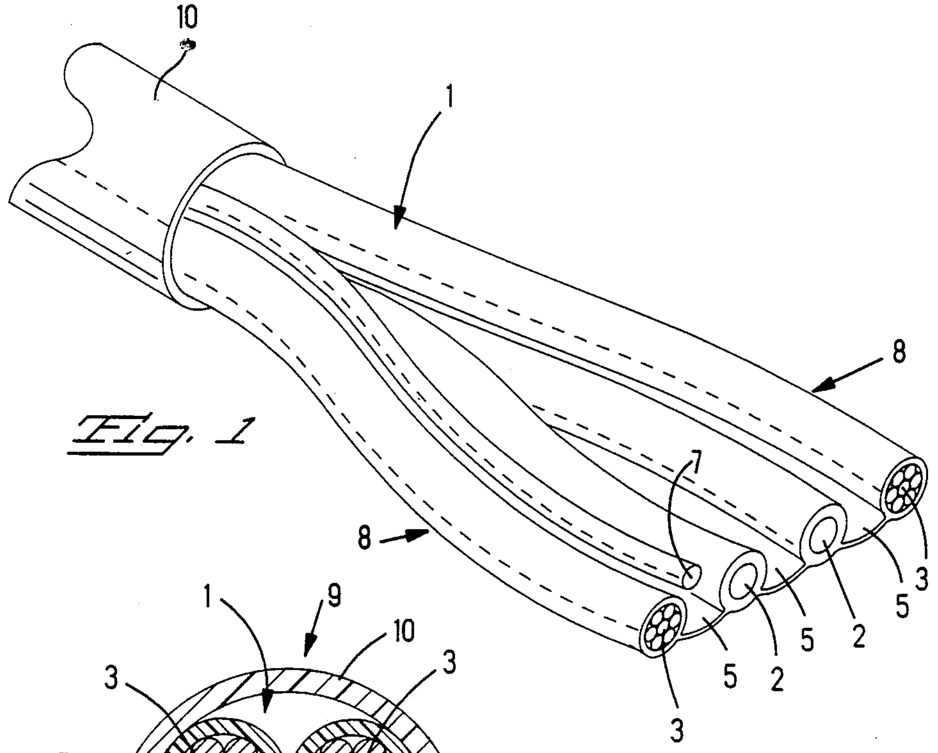
FIG. 1 is a fragmentary perspective view of a ribbon cable with a portion of the ribbon cable shown unrolled.
Figure 2:
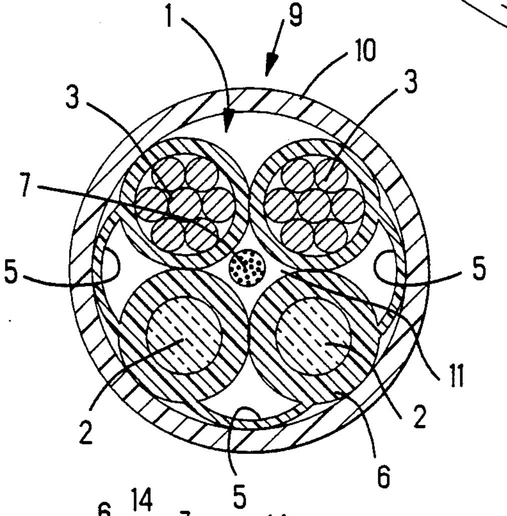
FIG. 2 is a section view transversely of the cable shown in FIG. 1.

With more particular reference to FIGS. 1 and 2, a ribbon cable 1 comprises, optical fibers 2 and electrical conductors 3, having multiple strands, spaced side to side within a surrounding, flexible jacket 4. The jacket 4 has corresponding webs 5 extending laterally between corresponding optical fibers 2 and corresponding conductors 3. The optical fibers 2 are commercially available, and are constructed of known plastics or glass materials having optical transmissive properties. The jacket 4 is any of the known, flexible polymeric materials that is capable of being formed by extrusion. The jacket 4 is formed in a known continuous extrusion operation to provide the webs 5. Each of the optical fibers 2 and each of the conductors 3 is contained within a corresponding sleeve 6 that is formed by the continuous extrusion process directly over the optical fibers 2 and the conductors 3. A loose flexible cord 7 extends lengthwise of the cable 1.

The cable 1 is constructed with two optical fibers 2 for transmitting optical signals in corresponding opposite directions. Two electrical conductors 3 accompany corresponding optical fibers 2 and transmit electrical power in corresponding opposite directions. The conductors 3 are located along lateral sides 8, 8 of the cable 1. A plane of the conductors 3 and the optical fibers 2 is defined as a plane containing the conductors 3 and the optical fibers 2 and extending through the axial centerlines of the conductors 3 and the optical fibers 2.

When the conductors 3 and the optical fibers 2 are laid flat, the cable 1 and the plane are considered also as being laid flat. Further, the conductors 3 and the optical fibers 2 are spaced laterally apart from one another, to facilitate stripping of the jacket 4 away from the conductors 3 and the optical fibers 2.

The cable 1 is rolled transversely of its length to form a roll 9, FIG. 2. A removable sheath 10 surrounds the roll 9 and prevents the cable 1 from being unrolled. FIG. 1 illustrates the sheath 10 being partially removed to expose a protruding section of the cable 1. The protruding section of the cable 1 is unrolled to position the conductors 3 and the optical fibers 2 spaced apart and in the plane that is flat.

The plane of the conductors 3 and the optical fibers 2 is arcuate within the roll 9, FIG. 2. To facilitate an arcuate shape to the plane, and further to facilitate rolling of the cable 1 without applying internal stress along the jacket 4 where the webs 5 join the sleeves 6, the planes of the webs 5 are curved or are curvilinear in the same direction as the direction of curvature of the arcuate plane of the conductors 3 and the optical fibers 2. Further, to facilitate movement of the conductors 3 and the optical fibers 2 toward one another and inwardly of the roll 9, the webs 5 are offset from the plane of the conductors 3 and the optical fibers 2, and are external to the arcuate form of the plane. The spans or widths of the webs 5 in a direction laterally of the cable 1 are more lengthy than the distances along the plane that separate adjacent corresponding conductors 3 and corresponding optical fibers 2 from one another.

An interstitial space 11 extends lengthwise of the roll 9 and is bounded by the sleeves 6. The sleeves 6 engage one another along the interstitial space 11. The cord 7 extends along the interstitial space 11. The four sleeves 6 have outer diameters of the same dimension and form a single interstitial space 11.

Figure 3:
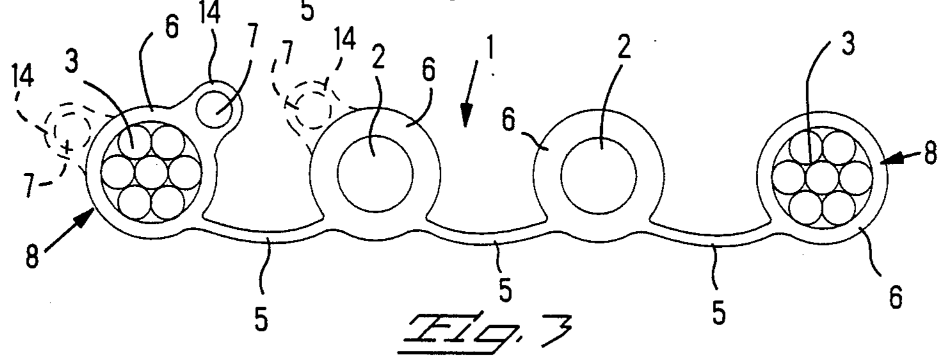
FIG. 3 is an enlarged section view of a portion of a ribbon cable shown unrolled.
Figure 4:
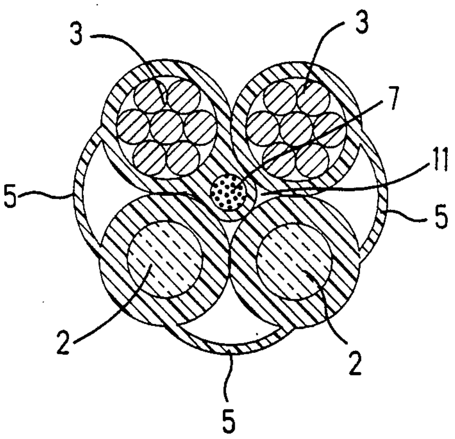
FIG. 4 is an enlarged section view of the cable shown in FIG. 3 rolled transversely of its length.

The cable 1 of FIGS. 1 and 2 can be modified, as disclosed with reference to FIGS. 3 and 4, such that the cord 7 can be secured to the cable 1. The jacket 4 disclosed by FIGS. 3 and 4 positions the cord 7 stationary along the length of the cable 1. To distinguish one lateral side 8 of the cable 1 from the other lateral side 8, the cord 7 is asymmetrically positioned with respect to the lateral sides 8 of the cable 1. To distinguish a top 12 from a bottom 13 of the cable 1, the cord 7 is positioned asymmetrically and outwardly of the plane of the conductors 3 and the optical fibers 2. The cord 7 is illustrated within a corresponding, surrounding sleeve 14 of the jacket 4. In FIG. 3 the cord 7 is located parallel to and adjacent one of the conductors 3, with the corresponding sleeves 6, 14 connected together. In phantom outline, the cord 7 is illustrated as being located parallel to and adjacent one of the optical fibers 2, with the corresponding sleeves 6, 14 connected together. In FIG. 4, the cable 1 as disclosed by FIG. 3 is formed into a roll 9 with the cord 7 being located along the interstitial space 11. Accordingly, the cord 7 is positioned opposite a portion of the corresponding conductor 3, or opposite a portion of the corresponding optical fiber 2, which portion faces the interstitial space 11.

Figure 5:
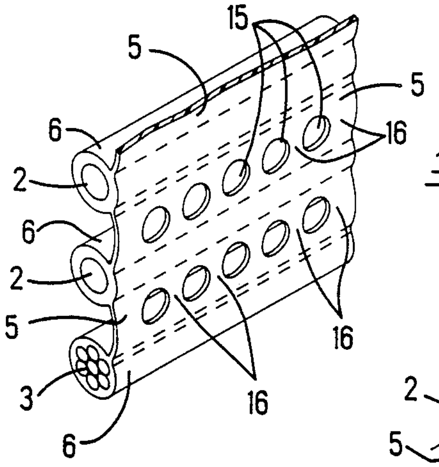
FIG. 5 is a fragmentary perspective view of a portion of the cable illustrating webs that permit relative shifting of portions of the cable.
Figure 6:
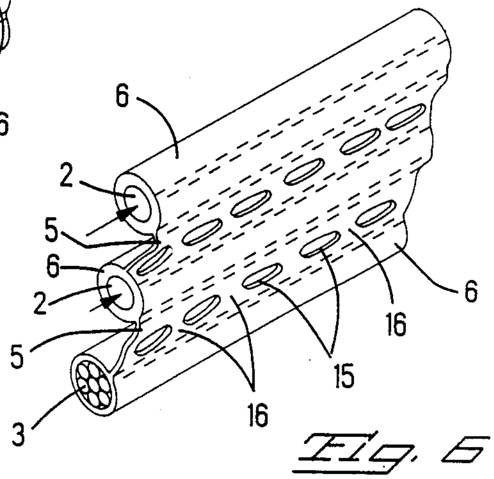
FIG. 6 is a view similar to FIG. 5 and illustrating relative shifting of portions of the cable.
Figure 7:
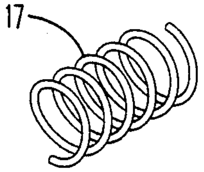
FIG. 7 is a fragmentary perspective view of a helically coiled cable.

Each web 5 can be continuous or, as disclosed with reference to FIG. 5, provided with a series of perforations 15 that vary in size, shape and number. The perforations 15 leave flexible strips 16 of the web 5 that extend between adjacent corresponding conductors 3 and corresponding optical fibers 2. The strips 16 and the perforations 15 become distorted in shape as the adjacent corresponding conductors 3 and corresponding optical fibers 2 are shifted axially of their lengths and relative to one another. Relative axial movement of the corresponding conductors 3 and corresponding optical fibers 2 will occur when the cable 1, in its rolled form, is subjected to bending along an arc. The corresponding conductors 3 along an outward side of the arc will shift relative to the corresponding conductors 3 and corresponding optical fibers 2 along an inward side of the arc. This will allow the cable to be coiled into a helix 17 as shown in FIG. 7, similar to a helically coiled telephone cord converting a telephone headset to a receiver of the headset.

Each of the discussed advantages, features and objectives of the disclosed invention exists independently and contributes to the use and importance of the invention.

I claim:

1. A ribbon cable comprising, optical fibers and electrical conductors, the optical fibers and the conductors are spaced side to side within a surrounding, flexible jacket, wherein the improvement comprises;

each optical fiber and each conductor is contained within a corresponding sleeve of the jacket, adjacent sleeves are connected by a corresponding flexible web extending transversely between the adjacent sleeves, the cable is rolled transversely of its length to form a roll, an interstitial space extends lengthwise of the roll and is bounded by the sleeves, an elongated cord extends in the interstitial space, the roll is constructed to be unrolled to space apart the sleeves one from another, and a removable sheath surrounds the roll and prevents the cable from being unrolled.

2. A ribbon cable as recited in claim 1, wherein the improvement comprises;

corresponding sleeves engage one another along the interstitial space, and the interstitial space is bounded by the sleeves.

3. A ribbon cable as recited in claim 1, wherein the improvement comprises;

each web is offset from a plane extending through centerlines of corresponding adjacent sleeves.

4. A ribbon cable as recited in claim 1, wherein the improvement comprises;

means of each web for permitting corresponding adjacent sleeves to shift longitudinally of the cable.

5. A ribbon cable as recited in claim 1, wherein the improvement comprises;

the cord is offset from a central axis of the cable when the cable is unrolled.

6. A ribbon cable as recited in claim 1, wherein the improvement comprises;

the cable is constructed to unroll to position the conductors and the optical fibers in a flat plane.

7. A ribbon cable as recited in claim 1, wherein the improvement comprises;

the sleeves form a single interstitial space extending lengthwise of the roll.

8. A ribbon cable as recited in claim 1, wherein the improvement comprises;

each web includes a series of strips spaced apart along the length of the cable, the strips being flexible to permit corresponding adjacent sleeves to shift longitudinally of the cable.

9. A ribbon cable as recited in claim 1, wherein the improvement comprises;

the cord is secured to the cable opposite a portion of a corresponding conductor or a corresponding optical fiber that faces the interstitial space.

10. A ribbon cable as recited in claim 1, wherein the improvement comprises;

the cord projects outwardly of a plane of the conductors and the optical fibers.

11. A ribbon cable as recited in claim 1, wherein the improvement comprises;

the cord is asymmetrically located with respect to lateral sides of the cable and with respect to a plane containing the conductors and the optical fibers.

12. A ribbon cable comprising;

optical fibers and electrical conductors spaced side to side within a surrounding, flexible jacket, the jacket has corresponding webs extending laterally between corresponding optical fibers and corresponding conductors, the cable is rolled transversely of its length to form a roll, the roll is constructed for unrolling to position the optical fibers and the conductors laterally spaced apart from one another, and a removable sheath surrounds the roll and prevents the roll from unrolling.

13. A ribbon cable, as recited in claim 12, comprising;

each web is offset from a plane extending through centerlines of the optical fibers and the centerlines of the conductors.

14. A ribbon cable as recited in claim 12, wherein the improvement comprises;

the cable is constructed to unroll to position the conductors and the optical fibers within a flat plane.

15. A ribbon cable as recited in claim 12, wherein the improvement comprises;

each web includes a series of strips spaced apart along the length of the cable, the strips being flexible to permit corresponding adjacent sleeves to shift longitudinally of the cable.

16. A ribbon cable as recited in claim 12, comprising;

means of each web for permitting corresponding optical fibers and corresponding conductors to shift longitudinally of the cable during flexure of the cable.

17. A ribbon cable as recited in claim 12, comprising;

an elongated cord within the sheath extends along the length of the cable.

18. A ribbon cable as recited in claim 17, wherein the improvement comprises;

the cord extends along an interstitial space extending lengthwise of the roll.

19. A ribbon cable as recited in claim 17, wherein the improvement comprises;

the cord projects outwardly of a common plane of the conductors and the optical fibers.

20. A ribbon cable as recited in claim 17, wherein the improvement comprises;

the cord is asymmetrically located with respect to lateral sides of the cable and with respect to a plane containing the conductors and the optical fibers.

* * * * *